United States Patent
Barrett et al.

(10) Patent No.: US 9,799,070 B1
(45) Date of Patent: Oct. 24, 2017

(54) SYSTEM AND METHOD FOR AGGREGATING AND PRESENTING FINANCIAL INFORMATION

(75) Inventors: David Barrett, San Francisco, CA (US); Witold Stankiewicz, San Francisco, CA (US)

(73) Assignee: Expensify, Inc., San Francisco, CA (US)

( * ) Notice: Subject to any disclaimer, the term of this patent is extended or adjusted under 35 U.S.C. 154(b) by 166 days.

(21) Appl. No.: 13/027,067

(22) Filed: Feb. 14, 2011

Related U.S. Application Data (60) Provisional application No. 61/304,471, filed on Feb. 14, 2010.

(51) Int. Cl.
*G06Q 40/00* (2012.01)

(52) U.S. Cl.
CPC .................................. *G06Q 40/00* (2013.01)

(58) Field of Classification Search
USPC .......................................................... 705/30
See application file for complete search history.

(56) References Cited

U.S. PATENT DOCUMENTS

| | | | |
|---|---|---|---|
| 5,578,808 A | 11/1996 | Taylor | |
| 6,018,735 A | 1/2000 | Hunter | |
| 6,065,675 A | 5/2000 | Teicher | |
| 6,473,500 B1 | 10/2002 | Risafi et al. | |
| 6,615,190 B1 | 9/2003 | Slater | |
| 7,104,443 B1 | 9/2006 | Paul et al. | |
| 7,127,426 B1 | 10/2006 | Coyle | |
| 7,249,092 B2 | 7/2007 | Dunn et al. | |
| 7,252,223 B2 | 8/2007 | Schofield | |
| 7,280,644 B2 | 10/2007 | Tamari et al. | |
| 7,401,731 B1 | 7/2008 | Pletz et al. | |
| 7,475,808 B1 | 1/2009 | Bishop | |
| 7,571,142 B1 | 8/2009 | Flitcroft | |
| 7,865,432 B2 | 1/2011 | Doran et al. | |
| 2003/0222136 A1 | 12/2003 | Bolle et al. | |
| 2005/0091153 A1 | 4/2005 | Monk | |
| 2005/0182711 A1 | 8/2005 | Pulkkinen et al. | |
| 2006/0155641 A1 | 7/2006 | Postrel | |
| 2006/0218024 A1* | 9/2006 | Lulla | 705/5 |
| 2006/0230004 A1 | 10/2006 | Handley | |
| 2007/0250441 A1 | 10/2007 | Paulsen et al. | |
| 2007/0255650 A1* | 11/2007 | Destrempes et al. | 705/39 |
| 2008/0017703 A1* | 1/2008 | Lu et al. | 235/379 |
| 2008/0103972 A1 | 5/2008 | Lane | |
| 2009/0228380 A1 | 9/2009 | Evanitsky | |

(Continued)

OTHER PUBLICATIONS

Final Office Action mailed Sep. 26, 2012 in U.S. Appl. No. 12/193,590.

(Continued)

*Primary Examiner* — Shay S Glass
(74) *Attorney, Agent, or Firm* — Mahamedi IP Law LLP (57) ABSTRACT

Disclosed herein is a system and method for managing financial information. According to an embodiment, electronic purchase data is received from an electronic payment source. The received electronic purchase data is generated into one or more visual representation formats using a transformation server. Once the visual representation has been generated, the visual representation format is rendered using a display device.

15 Claims, 3 Drawing Sheets

(56) References Cited

U.S. PATENT DOCUMENTS

2009/0249194 A1* 10/2009 Day .............................. 715/239
2009/0271265 A1* 10/2009 Lay et al. .................. 705/14.38

OTHER PUBLICATIONS

Non-Final Office Action mailed Feb. 15, 2012 in U.S. Appl. No. 12/193,590.
Non-Final Office Action mailed Jan. 7, 2014 in U.S. Appl. No. 12/193,590.

* cited by examiner

SYSTEM AND METHOD FOR AGGREGATING AND PRESENTING FINANCIAL INFORMATION

CROSS-REFERENCE TO RELATED APPLICATIONS

This application claims benefit of priority to U.S. Provisional Patent Application No. 61/304,471, entitled "System and Method of Aggregating and Presenting Financial Information", filed on Feb. 14, 2010. The aforementioned priority application is hereby incorporated by reference in its entirety.

TECHNICAL FIELD

Embodiments described herein pertain generally to a system and method for aggregating and presenting financial information.

DETAILED DESCRIPTION

Embodiments described herein include a system for enabling individual users to aggregate and manage financial information from multiple accounts. In particular, one or more embodiments enable users to manage expenses and costs from sources that include bank and credit card accounts.

According to some embodiments, electronic purchase data is obtained from a transaction or financial source, such as (i) an issuing bank for a credit card from which a purchase is made, (ii) merchant or related party (e.g. airline or booking service may provide such information for users). The electronic purchase data is transformed into one or more visual representation formats. The visual representation format enables the data to be represented in a visible form using a display device (e.g. display or printer).

Among other applications, embodiments enable users to track expenses that may qualify for tax benefits. For example, current tax regulations enable users to deduct expenses under $75 using corroborating evidence of the transaction. While the actual receipt a user receives from a transaction would corroborate the transaction, tracking and storing the actual receipts is cumbersome, particularly considering the volume of transactions under $75. According to some embodiments described herein, the user is able to generate a corroborating electronic receipt of a transaction using data obtained from a bank or credit card company (or other source) after the transaction has been completed. While the corroborating electronic receipt is not contemporaneously received by the user (e.g. when the transaction is made), it is sufficiently corroborative to enable the user to use the electronic receipt to make a tax deduction, or record a reimbursement.

As used herein, the terms "programmatic", "programmatically" or variations thereof mean through execution of code, programming or other logic. A programmatic action may be performed with software, firmware or hardware, and generally without user-intervention, albeit not necessarily automatically, as the action may be manually triggered.

One or more embodiments described herein may be implemented using programmatic elements, often referred to as modules or components, although other names may be used. Such programmatic elements may include a program, a subroutine, a portion of a program, or a software component or a hardware component capable of performing one or more stated tasks or functions. As used herein, a module or component, can exist on a hardware component independently of other modules/components or a module/component can be a shared element or process of other modules/components, programs or machines. A module or component may reside on one machine, such as on a client or on a server, or may alternatively be distributed amongst multiple machines, such as on multiple clients or server machines. Any system described may be implemented in whole or in part on a server, or as part of a network service. Alternatively, a system such as described herein may be implemented on a local computer or terminal, in whole or in part. In either case, implementation of system provided for in this application may require use of memory, processors and network resources (including data ports, and signal lines (optical, electrical etc.), unless stated otherwise.

Furthermore, one or more embodiments described herein may be implemented through the use of instructions that are executable by one or more processors. These instructions may be carried on a computer-readable medium. Machines shown or described with figures below provide examples of processing resources and computer-readable mediums on which instructions for implementing embodiments of the invention can be carried and/or executed. In particular, the numerous machines shown with embodiments of the invention include processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on many cell phones and personal digital assistants (PDAs)), and magnetic memory. Computers, terminals, network enabled devices (e.g. mobile devices such as cell phones) are all examples of machines and devices that utilize processors, memory, and instructions stored on computer-readable mediums. Additionally, embodiments may be implemented in the form of computer-programs, or a computer usable carrier medium capable of carrying such a program.

Figure 1:
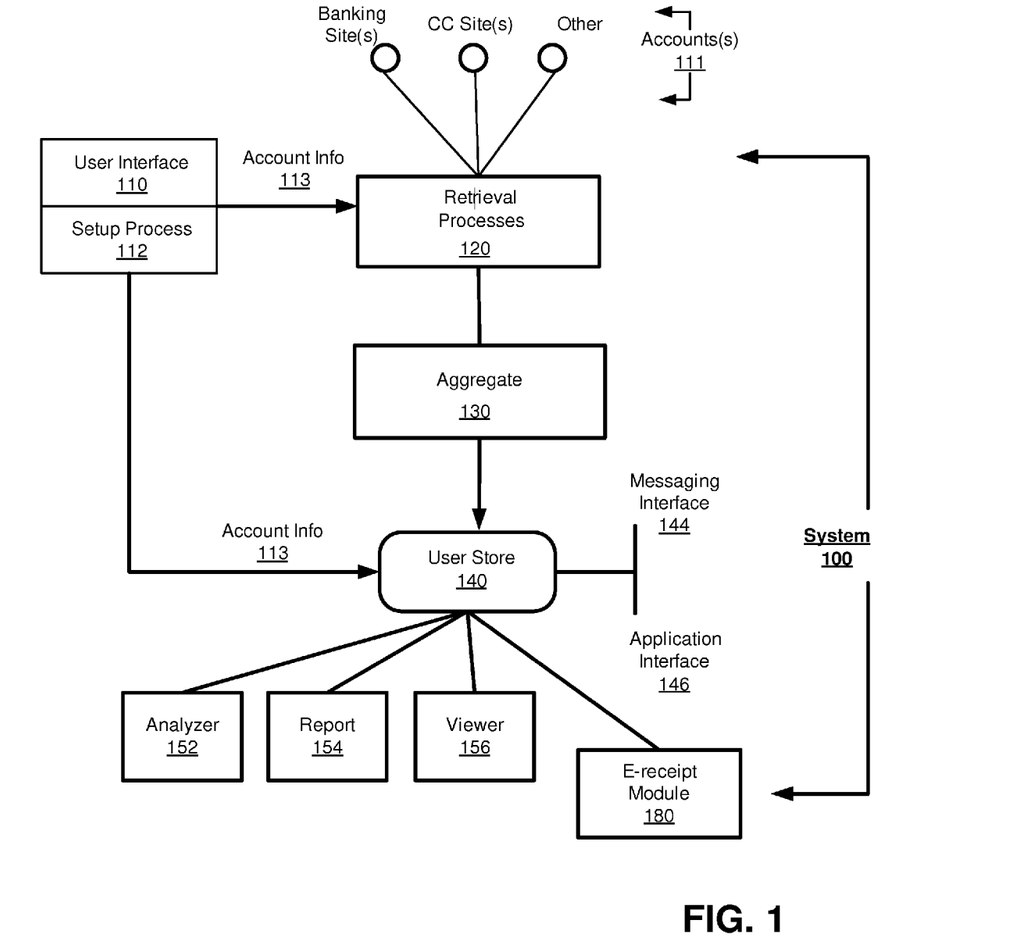
FIG. 1 illustrates a system for aggregating and presenting user financial information, according to an embodiment.

FIG. 1 illustrates a system for aggregating and presenting user financial information, according to one or more embodiments. A system 100 includes components for (i) enabling individuals to identify their individual financial accounts, (ii) retrieve financial information from various financial accounts specified for each user, (iii) submit or import transaction information (e.g. receipts, or information memorializing transactions), and (iv) enable generation of reports or other data that enables use and analysis of the retrieved financial information. Among other applications, one embodiment enables financial information that identifies a transaction to be visually reproduced as a corroborative (but not contemporaneous) receipt.

A system such as described by FIG. 1 may be implemented in various computing environments. In one embodiment, system 100 is provided as an online service, supported by a server or combination of servers. More specifically, a system such as described by FIG. 1 is generally implemented under a secure computing environment, to protect financial information of its users. In some embodiments, users of the service may interact with the service using a web browser (e.g. thin or non-client), or through a designated client application. Numerous different types of computing devices operated by users are enabled to interface with the service in order to perform activities enabled by embodiments described herein. In other implementations, alternative computing environments (e.g. client-centric) may be used to implement embodiments described herein.

In more detail, system 100 includes a user-interface 110 that can be accessed by individual users (persons or businesses) to set up a service account with the system 100. The user interface 110 includes a setup process 112 where the user identifies his or her financial accounts 111. The financial accounts 111 can correspond to, for example, (i) bank accounts, including checking or savings accounts, (ii) investment accounts, and (iii) credit cards.

During the setup process 112, the user provides the names and identifiers (e.g. website) for the financial institutions that provide the accounts, as well as financial account information 113. The financial account information 113 includes account numbers, login and password information, and any other information the user would otherwise use to manually access the financial account online. The user supplies sufficient information to enable automated access to the website that hosts the user's account. The retrieval process 120 can execute to login to the user's account (e.g. over the Internet), and to retrieve the data from the site. Specific examples of this information include (i) identifying the website that hosts the financial data, (ii) providing login and password, and (iii) providing alternative security information, such as mother's maiden name. The setup process 112 may execute to prompt the user to provide such information. In some implementations, the setup process 112 is intelligent, in that it can tailor the information the user is to provide based on the requirements of the specific financial account's website.

Once the user performs the set-up for his or her various accounts, the retrieval process(es) 120 execute for each of the financial accounts 111 specified by the user. For example, a user may access system 100 over the Internet, establish an account for the service provided by system 100 ("service account"), then specify numerous financial accounts (e.g. checking accounts and credit cards). The retrieval processes 120 are then implemented to automatically (or programmatically) retrieve financial information for each account associated with the service (e.g. checking and credit card). System 100 implements retrieval processes 120 that are configured for individual financial institutions and types of financial accounts. Retrieval processes 120 can access financial accounts 111 that retain data in different formats, including Open Financial Exchange (OFX) format, Quicken Financial Exchange (QFX) format, or Comma Separation Value (CSV) format. Other formats that are used with financial accounts 111 include HTML or PDF. System 100 can provide separately configured retrieval processes 120 that execute to retrieve financial data from accounts that use such formats (e.g. OFC, QFX). In addition, site specific scripts can be used to programmatically retrieve data from some financial accounts, particularly those financial accounts that use alternative data formats (such as CSV, HTML or PDF) to present information. In this way, the retrieval processes 120 are able to identify data elements by type or category from a given financial account, and import the data for processing into system 100.

The processing component 130 aggregates and prunes retrieved financial data for individual service accounts. More specifically, for individual service accounts, the financial information is aggregated and sorted by performance of steps that include (i) identifying transactions (e.g. electronic purchase data), (ii) identifying merchants, (iii) identify instances in the aggregated information where a transaction is recorded twice ("de-duplication"). In order to identify merchants, merchant name analysis can be performed. Merchants can sometimes be identified in financial records with cryptic codes or names. The merchant name analysis associates a proper name of the merchant with individual transactions.

One or more data stores 140 store each user's (i) financial data, including electronic purchase data, as retrieved from the various financial sites 111; (ii) financial account information 113 (e.g. website, login and password), (iii) service account data to identify the user on system 100.

In addition to information from financial accounts 111, users can submit transactional or other financial information, such as receipts, using, for example, a messaging application (email, SMS) or other interface (e.g. upload through the website). In one implementation, the user may submit an image of a receipt (e.g. the user may take a picture of the receipt). The image may be stored for the user's subsequent retrieval. In one implementation, the image is scanned and interpreted using, for example, optical character recognition. In alternative variations, the receipts may be reviewed and manually annotated by one or more human operators.

Still further, in one implementation, the user's financial account information 113 includes the user's cell phone number or email address. A messaging interface 144 can identify which service account a given message (text, picture) is associated with based on the email address or phone number of the incoming message. The contents of the message, including its attachment, are then stored in the data store 140 and associated with the service account of the user who made the submission. In another implementation the user may download a client application for a particular device (e.g. mobile device or computer) and enter receipts or other financial information through the application.

As an addition or alternative, system 100 can include an application interface 146 to communicate with such client-applications, and to associate data submitted from client applications with specific service accounts. As an example, a mobile client application can be generated for system 100, and downloaded by users who have service accounts supported by system 100. Pictures of receipts, attachments, or other information can be submitted to system 100 via the mobile application. The application interface 146 associates the information with the correct user and service account based on the identification information provided by the mobile client application.

A user may also upload statements or receipts. For example, a user may scan a statement (or receipt) into PDF and then upload it onto the website provided with the service. The system 100 may scan and process the information as if it was imported from another site. As another addition or alternative, the system 100 can import financial information from an account or data store (e.g. spreadsheet, other service). These imports, images and other information can also be stored or associated with data store 140. Thus, system 100 can operate to receive the user's financial information from numerous different types of sources.

The data store 140 can be accessed and used to analyze or present information for each account. For example, analyzer 152 can perform operations to sort, or categorize transactional information. A report generator 154 can be used to generate report, from parameters specified by the user. For example, the user can specify reports that show expenses by type and time-period, by merchant, or by category specified by the user. A viewer 156 may present an aggregated view or summary of the user's financial information (e.g. through a web browser or application). Other activities that can be performed on a user's financial information include enabling user's to act on certain financial data. For example, the user can act on a receipt by seeking reimbursement.

According to some embodiments, a receipt module 180 of system 100 is able to generate verifiable renderings of transactions identified from the user's financial data. The electronic receipt is not contemporaneous with the transaction (e.g. it is not the receipt that the user receives from a merchant), but one that is corroborative of the transaction, and verifiable using system 100.

Figure 2:
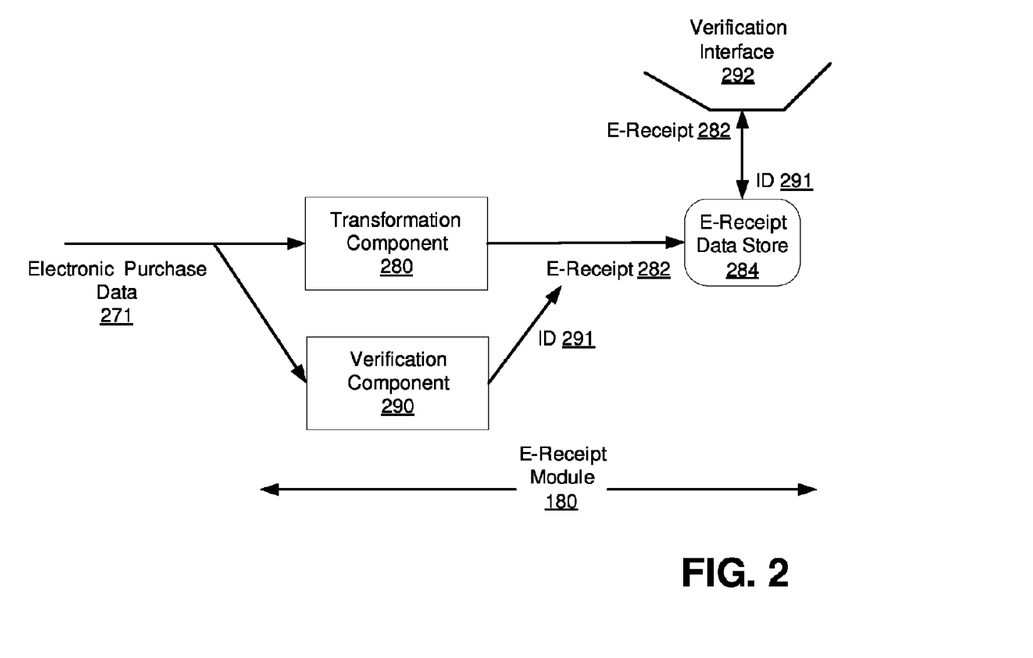
FIG. 2 illustrates components for receipt module, according to an embodiment.

FIG. 2 illustrates components for receipt module 180. The receipt module 180 processes a user's transactional data, such as electronic purchase data. This information can be processed from the data store 140, either automatically or on request from the user. The transactional data for purchases and similar transactions may identify (i) date of transaction (or an alternative date in which the transaction was posted), (ii) amount of transaction, (iii) account information, (iv) name of merchant, (v) name of consumer/customer, (vi) name of financial institution that the user used in providing payment (e.g. credit card company, bank), (vii) sales tax, (viii) value-added tax (VAT), (ix) tip, (x) categorical purchases (e.g. liquor), and (xi) line-item data." The particular components and format of the data may vary, as it is supplied by the financial institutions. In many cases, the electronic purchase data is provided in accordance with standards such as ISO 8583 Standard for Financial Transaction Card Originated Messages.

The receipt module 180 includes a transformation component 280 that processes electronic purchase data 271 for individual user transactions in order to generate corresponding receipts 282. The receipt module 180 generates receipts 282 that visually render the information to the user or third-parties in a manner that enables a particular transaction (e.g. purchase) to be corroborated.

In an embodiment, the transformation component 280 transforms data of a particular transaction (e.g. purchase) as supplied by a financial institution (e.g. credit card company) into a visual format. For example, the financial information may originate from the financial institution in OCX, QFX, or CSV formats. The transformation component 280 is configured to parse electronic purchase data in any one of various possible formats, as provided from anyone of many different banks, credit card companies or other financial institutions, in order to represent the electronic data in a visual format, such as HTML or PDF. Each e-receipt 282 may correspond to an electronic or printed document that presents the data of a corresponding transaction in a corresponding visual format.

The individual receipts 282 can be stored in a data store 284 that associates the receipts with individual service accounts. The data store 284 enables each user of system 100 to see his or her own receipts. Additionally, as described below, database 284 enables the receipts to be processed and viewed independent of user accounts, to third-parties for purpose of corroboration.

According to an embodiment, system 100 enables verification of receipts 282 generated from receipt module 180. Support for different levels of verification can be provided, including (i) verification that a given e-receipt 282 was actually what was generated by the system 10; (ii) verification that the given e-receipt 282 was generated from true data (e.g. e-receipt was generated from data as received from financial institution).

To enable verification that the given e-receipt 282 was generated from system 100, receipt module 180 includes a verification component 290 that stamps an identifier 291 on the e-receipt 282. In one implementation, the verification component 290 generates the identifier when the e-receipt 282 is generated. The contents of the e-receipt 282 thus include the identifier 291, and when the e-receipt 282 is stored, it includes the identifier. A verification interface 292 may be provided with the e-receipt store 284 that receives as input the identifier 291, then generates a rendition that is the e-receipt 282. An auditor (or other party seeking verification) can then access the service provided by system 100, and use the verification interface 292 to submit the identifier 291, in order to verify first hand whether a e-receipt 282 is valid. Thus, a third-party in possession of the receipt (or a print out of it) can independently verify the information provided with each e-receipt 282 (to the extent that is represents what was generated from system 100).

To enable verification that the given e-receipt 282 was generated from true data, processes or components that import electronic purchase data 271 (e.g. retrieval processes, messaging interface) are configured to record origination information 291 for records of financial information imported at various instances. The origination information can reflect, for example, the time the financial information was imported. Additionally, the contents of each import are permanently stored and not altered, and identifiable from the origination information. Each e-receipt 282 can be associated with its origination information, enabling identification of the time and source for data from which the electronic purchase data was identified, and the e-receipt was generated. If additional verification is needed, the contents of the original record can also be checked. The contents of the original record provide the original financial information that contained the electronic purchase data of the e-receipt 282.

As an addition or alternative, additional programmatic elements may process or analyze the electronic purchase data supplement or enhance the e-receipt 282. In one embodiment, an e-receipt analysis component may process and analyze the electronic purchase data before it is transformed and/or rendered to supplement the basis information. Additional information that can be added to the e-receipt include information to itemize the products or elements of the transaction (e.g. list each item purchased in a meal, or from a store). Such itemization facilitates the user in being able to treat different elements of the transaction differently (e.g. when only a portion of the transaction qualifies as a tax deduction). Other examples of supplemental information for the e-receipt 282 include (i) identifying other persons who were present in the transaction (other persons that the user dined with), and (ii) how much was spent on sales tax or liquor. The e-receipt 282 may highlight parts or components that are being claimed for reimbursement, versus parts that are not being claimed (e.g. personal purchases made at the same time as a business purchase). Additional programmatic elements may also be configured to split the expense into multiple sub-receipts, even when the purchase was made in one transaction (e.g. a hotel stay is often treated as a separate expense per day).

Still further, additional processing for the e-receipt 282 includes enabling the user to modify the e-receipt to better identify the merchant (e.g. merchant names are often coded) or the date of the transaction (e.g. date of transaction recorded by financial institution may reflect date the transaction was posted, rather than the date the transaction was done). In such instances, the e-receipt 282 may reflect both (i) the original electronic purchase data information, and (ii) modifications made by the user (updated data). For example, changes made by the user may be highlighted on the e-receipt, or the original data changed may be redlined or shown as edited.

Figure 3:
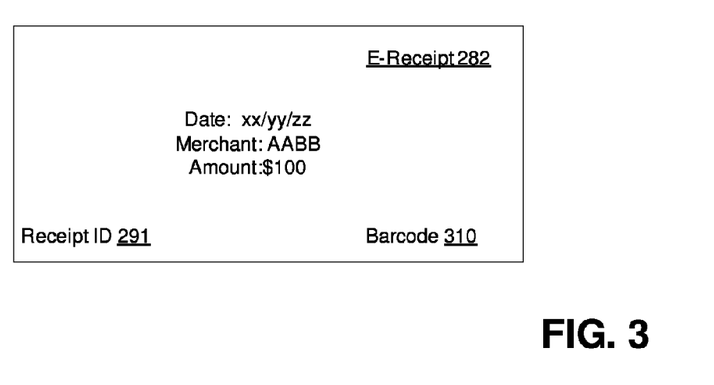
FIG. 3 illustrates an electronic receipt, according to an embodiment.

FIG. 3 illustrates an electronic receipt, according to an embodiment. The e-receipt 282 is a visual formatted rendering of electronic purchase/transaction data. As mentioned, it is corroborative of the user's transaction, and can substitute for the user's original receipt, which may have been generated at the time of the transaction. Among other benefits, the e-receipt 282 enables the user to provide corroboration for purpose of receiving reimbursement or making deductions.

In an embodiment depicted, e-receipt 282 displays transactional information provided from the financial institution. This includes (i) merchant name or identifier, (ii) date of transaction, and (iii) amount of transaction. Other components of the information include name of the purchaser, and the account/mode of payment used to make the purchase. In some implementations, the information displayed corresponds to 'Level 2' financial data. The e-receipt identifier 291 may also be visibly presented on the e-receipt 282 to enable viewing and/or verification of the e-receipt 282.

In some embodiments, the e-receipt 282 is generated to include a portion that is bar-coded or otherwise machine-readable 310. The machine-readable portion 310 may carry some or all of the information presented in the receipt, including the name of the merchant, and the amount and date of the transaction. The machine-readable portion 310 can thus add an additional layer of security that limits the potential for e-receipts 282 to be falsified by a user. The bar-coded region also facilitates processing of receipts on a large scale using bar-code reading devices. As an alternative to barcodes, the machine-readable portion 310 may be provided in form of a QR code.

E-receipt 282 can be generated for display devices such as monitors, display screens (e.g. such as for mobile computing devices) or printers (physical or electronic). Still further, the receipts may be renderable on a web browser, or HTML/PDF compatible software component.

Figure 4:
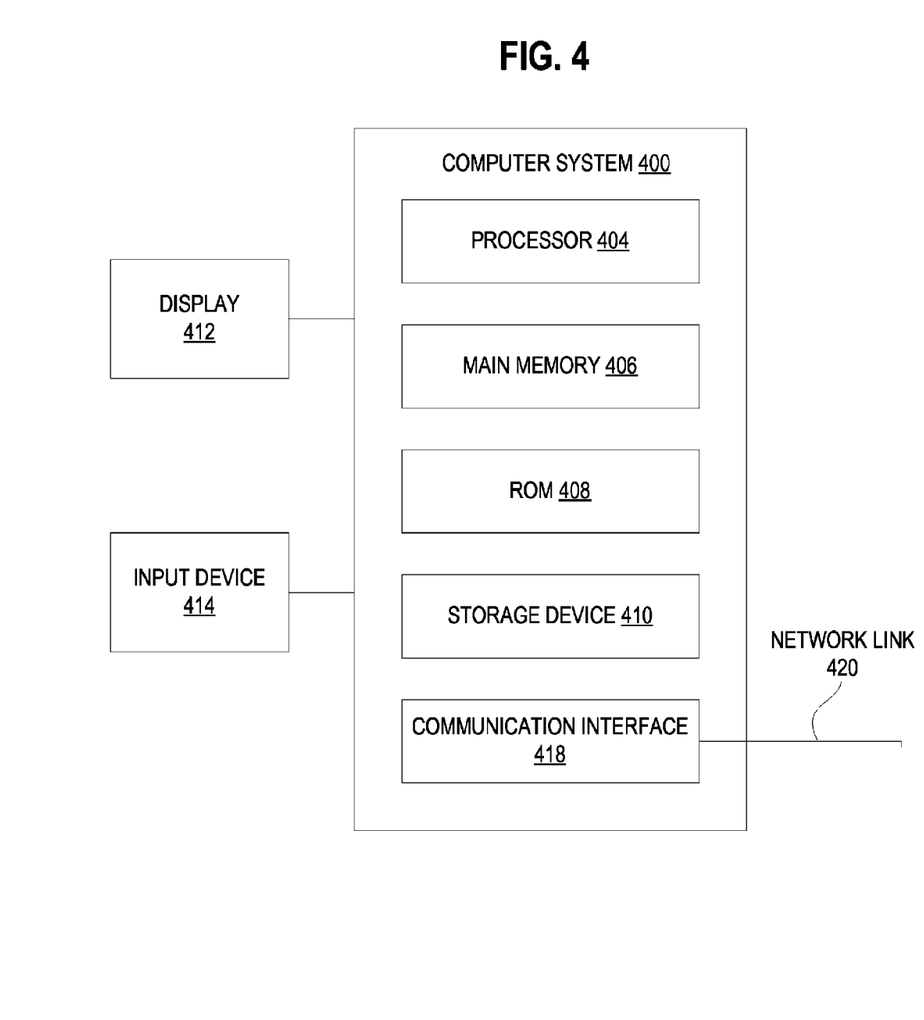
FIG. 4 is a block diagram that illustrates a computer system upon which one or more embodiments described herein may be implemented.

In an embodiment, one or more components of the system 100 (FIG. 1) may be implemented on or using a computer system. FIG. 4 is a block diagram that illustrates a computer system 400 upon which one or more embodiments may be implemented. In an embodiment, computer system 400 includes processor 404, main memory 406, ROM 408, storage device 410, and communication interface 418. Computer system 400 includes at least one processor 404 for processing information. Computer system 400 also includes a main memory 406, such as a random access memory (RAM) or other dynamic storage device, for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device for storing static information and instructions for processor 404. A storage device 410, such as a magnetic disk or optical disk, is provided for storing information and instructions.

Computer system 400 may be coupled to a display 412, such as a cathode ray tube (CRT), a LCD monitor, or a television set, for displaying information to a user. An input device 414, including alphanumeric and other keys, is coupled to computer system 400 for communicating information and command selections to processor 404. Other non-limiting, illustrative examples of input device 414 include a mouse, a trackball, or cursor direction keys for communicating direction information and command selections to processor 404 and for controlling cursor movement on display 412. While only one input device 414 is depicted in FIG. 4, embodiments disclosed herein may include any number of input devices 414 coupled to computer system 400.

One or more embodiments are related to the use of computer system 400 for implementing the techniques described herein. According to one embodiment, those techniques are performed by computer system 400 in response to processor 404 executing one or more sequences of one or more instructions contained in main memory 406. Such instructions may be read into main memory 406 from another machine-readable medium, such as storage device 410. Execution of the sequences of instructions contained in main memory 406 causes processor 404 to perform the process steps described herein. In alternative embodiments, hard-wired circuitry may be used in place of or in combination with software instructions to implement embodiments of the invention. Thus, embodiments disclosed herein are not limited to any specific combination of hardware circuitry and software.

The term "machine-readable storage medium" as used herein refers to any medium that participates in storing instructions which may be provided to processor 404 for execution. Such a medium may take many forms, including but not limited to, non-volatile media and volatile media. Non-volatile media includes, for example, optical or magnetic disks, such as storage device 410. Volatile media includes dynamic memory, such as main memory 406.

Non-limiting, illustrative examples of machine-readable media include, for example, a floppy disk, a flexible disk, hard disk, magnetic tape, or any other magnetic medium, a CD-ROM, any other optical medium, a RAM, a PROM, and EPROM, a FLASH-EPROM, any other memory chip or cartridge, or any other medium from which a computer can read.

Various forms of machine readable media may be involved in carrying one or more sequences of one or more instructions to processor 404 for execution. For example, the instructions may initially be carried on a magnetic disk of a remote computer. The remote computer can load the instructions into its dynamic memory and send the instructions over a network link 420 to computer system 400.

Communication interface 418 provides a two-way data communication coupling to a network link 420 that is connected to a local network. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through a local network to a host computer or to data equipment operated by an Internet Service Provider (ISP).

Computer system 400 can send messages and receive data, including program code, through the network(s), network link 420 and communication interface 418. For example, a server might transmit a requested code for an application program through the Internet, a local ISP, a local network, subsequently to communication interface 418. The received code may be executed by processor 404 as it is received, and/or stored in storage device 410, or other non-volatile storage for later execution.

Although illustrative embodiments have been described in detail herein with reference to the accompanying drawings, variations to specific embodiments and details are encompassed by this disclosure. It is intended that the scope of the invention is defined by the following claims and their equivalents. Furthermore, it is contemplated that a particular feature described, either individually or as part of an embodiment, can be combined with other individually described features, or parts of other embodiments. Thus, absence of describing combinations should not preclude the inventor(s) from claiming rights to such combinations.

What is claimed is:

1. A computer implemented method for managing financial information, the method being implemented by one or more processors of a computer system and comprising the steps of:
    (A) obtaining, from a third party source that maintains records for a financial account of a user, electronic purchase data for a transaction with a third party merchant for which payment was made using the financial account of the user;
    (B) obtaining origination information for the electronic purchase data, the origination information identifying the third-party source and a time when the electronic purchase data was obtained from the third-party source;
    (C) permanently storing the electronic purchase data obtained from the third party source for the transaction without alteration, along with the origination information;
    (D) generating an electronic receipt to memorialize the transaction, separate from a merchant receipt, the electronic receipt being generated for the user using the electronic purchase data, wherein the electronic receipt is associated with the stored electronic purchase data and includes information that is based on but not the same as the electronic purchase data;
    wherein generating the electronic receipt includes:
        (i) generating a verification identifier that is unique to the electronic receipt on the electronic receipt, the verification identifier being generated after the electronic purchase data and origination information is obtained, and
        (ii) linking the electronic receipt to the stored electronic purchase data and the origination information;
    (E) providing an interface to enable a third party submitter to remotely verify the receipt over a network by submitting the verification identifier through the interface, independent of information specific to the user; and
    (F) in response to receiving the verification identifier, displaying content that is based on at least one of the electronic purchase data or origination information for the transaction of the electronic receipt.

2. The method according to claim 1, wherein the electronic purchase data is represented using at least one of: i) the Open Financial Exchange (OFX) format; ii) the Quicken Financial Exchange (QFX) format; or iii) the Comma Separation Value (CSV) format, or iv) hypertext markup language (HTML).

3. The method according to claim 1, wherein the electronic purchase data is represented using the ISO 8583 Standard for Financial Transaction Card Originated Messages.

4. The method according to claim 1, wherein (A) through (F) are performed using a computing device connected to a card issuing bank over a communications network.

5. The method according to claim 4, wherein the communications network is the Internet.

6. The method according to claim 4, wherein the computer system includes a server to retrieve the electronic purchase data from a database operated by the financial institution.

7. The method according to claim 1, wherein the electronic receipt is at least partially formatted in HyperText Markup Language (HTML).

8. The method according to claim 1, wherein the electronic receipt is formatted in Portable Document Format (PDF).

9. The method according to claim 1, wherein said electronic receipt uses a monotype font.

10. The method of claim 1, wherein (D) includes identifying a code that corresponds to a proper name of the merchant, and referencing the code to a database to determine the proper name of the merchant for display on the electronic receipt.

11. The method of claim 1, wherein (D) includes identifying a partial name that corresponds to a proper name of the merchant, and referencing the partial name to a database to determine the proper name of the merchant for display on the electronic receipt.

12. The method of claim 1, wherein (D) includes providing transactional information on the electronic receipt, including at least one of a financial amount of the transaction, a date of the transaction, or a date the transaction was posted.

13. The method of claim 12, wherein the transaction information includes machine-readable data for the electronic receipt.

14. A non-transitory computer readable medium that stores instructions, which when executed by one or more processors of a computer system, cause the computer system to perform operations that include:
    (A) obtaining, from a third party source that maintains records for a financial account of a user, electronic purchase data for a transaction with a third party merchant for which payment was made using the financial account of the user;
    (B) obtaining origination information for the electronic purchase data, the origination information identifying the third-party source and a time when the electronic purchase data was obtained from the third-party source;
    (C) permanently storing the electronic purchase data obtained from the third party source for the transaction without alteration, along with the origination information;
    (D) generating an electronic receipt to memorialize the transaction, separate from a merchant receipt, the electronic receipt being generated for the user using the electronic purchase data, wherein the electronic receipt is associated with the stored electronic purchase data and includes information that is based on but not the same as the electronic purchase data;

wherein generating the electronic receipt includes:
   (i) generating a verification identifier that is unique to the electronic receipt on the electronic receipt, the verification identifier being generated after the electronic purchase data and origination information is obtained, and
   (ii) linking the electronic receipt to the stored electronic purchase data and the origination information;

(E) providing an interface to enable a third party submitter to remotely verify the receipt over a network by submitting the verification identifier through the interface, independent of information specific to the user; and (F) in response to receiving the verification identifier, displaying content that is based on at least one of the electronic purchase data or origination information for the transaction of the electronic receipt.

15. A computer system comprising:

a memory that stores instructions;

one or more processors that access the instructions to:

(A) obtain, from a third party source that maintains records for a financial account of a user, electronic purchase data for a transaction with a third party merchant for which payment was made using the financial account of the user;

(B) obtain origination information for the electronic purchase data, the origination information identifying the third-party source and a time when the electronic purchase data was obtained from the third-party source;

(C) permanently store the electronic purchase data obtained from the third party source for the transaction without alteration, along with the origination information;

(D) generate an electronic receipt to memorialize the transaction, separate from a merchant receipt, the electronic receipt being generated for the user using the electronic purchase data, wherein the electronic receipt is associated with the stored electronic purchase data and includes information that is based on but not the same as the electronic purchase data;

wherein the one or more processors generate the electronic receipt by:
   (i) generating a verification identifier that is unique to the electronic receipt on the electronic receipt, the verification identifier being generated after the electronic purchase data and origination information is obtained, and
   (ii) linking the electronic receipt to the stored electronic purchase data and the origination information;

(E) provide an interface to enable a third party submitter to remotely verify the receipt over a network by submitting the verification identifier through the interface, independent of information specific to the user; and (F) in response to receiving the verification identifier, display content that is based on at least one of the electronic purchase data or origination information for the transaction of the electronic receipt.

* * * * *